United States Patent
Koskinen

(10) Patent No.: US 8,300,664 B2
(45) Date of Patent: Oct. 30, 2012

(54) ENHANCED ALLOCATION AND SIGNALING OF RADIO FRAMES CONTAINING MULTIMEDIA BROADCAST SINGLE FREQUENCY NETWORK SUBFRAMES

(75) Inventor: Henri Markus Koskinen, Espoo (FI)

(73) Assignee: Nokia Corporation, Espoo (FI)

( * ) Notice: Subject to any disclaimer, the term of this patent is extended or adjusted under 35 U.S.C. 154(b) by 554 days.

(21) Appl. No.: 12/556,081

(22) Filed: Sep. 9, 2009

(65) Prior Publication Data
US 2010/0157919 A1    Jun. 24, 2010

Related U.S. Application Data

(60) Provisional application No. 61/191,590, filed on Sep. 9, 2008.

(51) Int. Cl.
*H04J 3/00* (2006.01)
(52) U.S. Cl. ............ 370/476; 370/329; 455/72
(58) Field of Classification Search .......... 370/310, 370/328, 329, 282, 464, 476, 480, 496; 455/39, 455/68, 70, 72
See application file for complete search history.

(56) References Cited

U.S. PATENT DOCUMENTS

2008/0232254 A1* 9/2008 Chhaya et al. ............ 370/236
2011/0013554 A1* 1/2011 Koskinen ................. 370/315

OTHER PUBLICATIONS

ZTE, "Improvement on MBSFN subframe signalling" TSG-RAN2#63, R2-084564, Jeju Island, South Korea; Aug. 18-Jul. 22, 2008.*
ZTE, "Improvement on MBSFN subframe signalling", TSG-RAN2#63 R2-083974 Jeju Island, South Korea; Aug. 18-Jul. 22, 2008.

* cited by examiner

*Primary Examiner* — Chi Pham
*Assistant Examiner* — Weibin Huang
(74) *Attorney, Agent, or Firm* — Squire Sanders (US) LLP

(57) ABSTRACT

The Exemplary embodiments of the invention provide at least a method, apparatus, and computer program for signaling parameters to at least one network node in a communications network. In accordance with the exemplary embodiments, the signaling is performed by operations that include, signaling a first parameter A, and jointly signaling, to the at least one network node in the communications network, a second parameter B and a third parameter C. In addition, the exemplary embodiments of the invention provide at least a method, apparatus, and computer program for receiving parameters from at least one network node in a communications network by operations that include receiving signaling comprising a first parameter A and joint signaling indicating a second parameter B and a third parameter C, and extracting the parameters from the received signaling.

17 Claims, 3 Drawing Sheets

ENHANCED ALLOCATION AND SIGNALING OF RADIO FRAMES CONTAINING MULTIMEDIA BROADCAST SINGLE FREQUENCY NETWORK SUBFRAMES

CROSS-REFERENCE TO RELATED APPLICATIONS

This patent application claims priority under 35 U.S.C. §119(e) from Provisional Patent Application No. 61/191,590, filed Sep. 9, 2008, the disclosure of which is incorporated by reference herein in its entirety.

TECHNICAL FIELD

The exemplary and non-limiting embodiments of this invention relate generally to wireless communication systems, methods, devices and computer programs and, more specifically, relate to procedures for providing a multimedia broadcast service for user equipment.

BACKGROUND

This section is intended to provide a background or context to the invention that is recited in the claims. The description herein may include concepts that could be pursued, but are not necessarily ones that have been previously conceived or pursued. Therefore, unless otherwise indicated herein, what is described in this section is not prior art to the description and claims in this application and is not admitted to be prior art by inclusion in this section.

Various abbreviations that appear in the specification and/or in the drawing figures are defined as follows:

| | |
|---|---|
| 3GPP | third generation partnership project |
| CP | cyclic prefix |
| DL | downlink |
| eNB | evolved Node B (LTE base station) |
| E-UTRAN | evolved UTRAN |
| LTE | long term evolution of UTRAN |
| MBMS | multimedia broadcast/multicast service (as defined in 3GPP) |
| MBSFN | multimedia broadcast single frequency network |
| MCH | multicast channel |
| MSAP | MCH subframe allocation pattern |
| BCCH | broadcast control channel |
| UMTS | universal mobile terrestrial network |
| UTRAN | UMTS terrestrial radio access network |
| SFN | system frame number |
| LTE | long term evolution |
| Node B | base station |
| eNB | EUTRAN Node B (evolved Node B) |
| UE | user equipment |
| UL | uplink (UE towards eNB) |
| DL | downlink (eNB towards UE) |
| EPC | evolved packet core |
| MME | mobility management entity |
| S-GW | serving gateway |
| MM | mobility management |
| HO | handover |
| PHY | physical |
| RLC | radio link control |
| RRC | radio resource control |
| RRM | radio resource management |
| MAC | medium access control |
| PDCP | packet data convergence protocol |
| O&M | operations and maintenance |
| OFDMA | orthogonal frequency division multiple access |
| SC-FDMA | single carrier, frequency division multiple access |
| SIB | system information block |
| FDD | frequency division duplex |
| TDD | time division duplex |

A communication system known as evolved UTRAN (EUTRAN, also referred to as UTRAN-LTE or as E-UTRA) has been under development within the 3GPP. The DL access technique is OFDMA, and the UL access technique is SC-FDMA.

One specification of interest is 3GPP TS 36.300, V8.5.0 (2008-05), 3rd Generation Partnership Project; Technical Specification Group Radio Access Network; Evolved Universal Terrestrial Radio Access (E-UTRA) and Evolved Universal Terrestrial Access Network (E-UTRAN); Overall description; Stage 2 (Release 8).

FIG. 1 reproduces FIG. 4 of 3GPP TS 36.300, and shows the overall architecture of the E-UTRAN system. The E-UTRAN system includes eNBs, providing the EUTRA user plane (PDCP/RLC/MAC/PHY) and control plane (RRC) protocol terminations towards the UE. The eNBs are interconnected with each other by means of an X2 interface. The eNBs are also connected by means of an 51 interface to an EPC, more specifically to a MME (Mobility Management Entity) by means of a S1MME interface and to a Serving Gateway (SGW) by means of a S1U interface. The S1 interface supports a many to many relationship between MMEs/Serving Gateways and eNBs.

The eNB hosts the following functions:

functions for Radio Resource Management: Radio Bearer Control, Radio Admission Control, Connection Mobility Control, Dynamic allocation of resources to UEs in both uplink and downlink (scheduling);

IP header compression and encryption of the user data stream;

selection of a MME at UE attachment;

routing of User Plane data towards Serving Gateway;

scheduling and transmission of paging messages (originated from the MME);

scheduling and transmission of broadcast information (originated from the MME or O&M); and measurement and measurement reporting configuration for mobility and scheduling.

E-UTRAN is planned to support MBMS and, in particular, MBSFN operation in which macro diversity gain is accomplished by transmitting exactly the same signals from all base stations (eNBs) that are part of the MBSFN.

Reference with regard to MBMS can be made generally to 3GPP TS 36.331 V8.2.0 (2008-05), Technical Specification 3rd Generation Partnership Project; Technical Specification Group Radio Access Network; Evolved Universal Terrestrial Radio Access (E-UTRA) Radio Resource Control (RRC); Protocol specification (Release 8).

It should be noted that the above-referenced RRC specification is not an MBMS-specific reference in and of itself. It does, however, contain the discussed MBSFN subframe allocation signaling in the specified Release-8, so that Release-8 compatible terminals can properly treat possible MBSFN subframes in future networks. At present, the specification of MBMS itself has been postponed from Rel-8 to some later release.

MBMS can be provided either on a dedicated MBMS frequency layer or a mixed layer, where unicast transmission (including single-cell MBMS content) can be time multiplexed with MBSFN transmission on the same frequency layer. In the latter case, MBSFN transmission will occupy dedicated subframes (1-ms time intervals) whose structure differs from the normal unicast subframes in terms of, e.g., CP and reference signals.

It is noted that 3GPP TSG RAN WG2 has agreed to the following scheme for the allocation and signaling of radio frames that carry MBSFN subframes:

(1.) Radio frames containing MBSFN subframes appear when SFN mod N=Offset is true (SFN=System Frame Number is a running numbering of radio frames).
(2.) The parameters N and Offset are signaled on the BCCH.
(3.) Parameter N may take values 1, 2, 4, 8, 16, 32 (and is signaled with 3 bits).
(4.) Parameter Offset may take integer values between 0, . . . , 7 (and is signaled with 3 bits).

The value range of N corresponds to having in every period of 32 radio frames, respectively, 32, 16, 8, 4, 2, or 1 frame containing MBSFN subframes. More than one such allocation can be concurrently used, with the cost of each such allocation requiring altogether 9 signaling bits on the BCCH, i.e. the parameters N, Offset, and Subframeallocation (not mentioned above).

At least one problem with this proposal is the limited set of possible reservations of MBSFN subframes per time period (or rates of MBSFN subframes) per allocation: given that in any one allocation each frame containing MBSFN subframes is signaled to contain anywhere between 1 and 7 MBSFN subframes, the reservations of MBSFN subframes every 32 frames (i.e. 320 subframes or 320 ms) are limited to all the pairwise products from the sets $\{1, 2, 3, \ldots, 7\}$ and $\{32, 16, 8, 4, 2, 1\}$. For example, if the network operator wishes to start an MBMS service whose data rate is estimated to require 129 MBSFN subframes per 320 ms, the operator must in fact reserve 160 MBSFN subframes (or use more than one allocation and correspondingly at least double the number of signaling bits). This inefficient form of scheduling, in this example, means that 31 MBSFN subframes (and 6 entire radio frames) per 320 ms are reserved for no purpose, thereby wasting valuable bandwidth.

SUMMARY

In an exemplary aspect of the invention, there is a method comprising signaling parameters to at least one network node in a communications network by operations that comprise, signaling a first parameter A, and jointly signaling, to the at least one network node in the communications network, a second parameter B and a third parameter C.

In another exemplary aspect of the invention, there is an apparatus comprising at least one processor and at least one memory including computer program code, the at least one memory and the computer program code are configured, with the at least one processor, to cause the apparatus, to signal parameters to at least one network node in a communications network, by performing operations that comprise, signaling a first parameter A, and jointly signaling, to the at least one network node in the communications network, a second parameter B and a third parameter C.

In still another exemplary aspect of the invention, there is a method comprising receiving parameters from at least one network node in a communications network by operations that comprise, receiving signaling comprising a first parameter A and joint signaling indicating a second parameter B and a third parameter C, and extracting the parameters from the received signaling.

BRIEF DESCRIPTION OF THE DRAWINGS

The foregoing and other aspects of embodiments of this invention are made more evident in the following Detailed Description, when read in conjunction with the attached Drawing Figures, wherein.

DETAILED DESCRIPTION

The exemplary embodiments of this invention provide techniques that improve MBFSN subframe signaling and provide an efficient signaling method, where an arbitrary number of frames can be reserved for the signaling. In TSG-RAN2#63, R2-084564, "Improvement on MBSFN subframe signalling", Jeju Island, South Korea; 18th-22 Aug. 2008 ZTE it was proposed to signal an additional parameter Q using between 3 to 5 additional signaling bits. The parameter Q is intended to express how many of the first radio frames implied by the other parameters {N, Offset} in every 32-frame period the allocation actually applies.

More specifically, in R2-084564 it was stated that at the RAN2 #62bis meeting in Warsaw various solutions for MBSFN frame allocation, and which SIB was used to transmit the signaling, were discussed. An Option C was agreed upon, and SIB2 was specified to carry the MBSFN mapping information. The Option C involves multiple periodic patterns with 9 bits: (3 bits micro+6 bits macro) per pattern.

The MBSFN subframes allocation signal contained the following:
(1) Radio frames containing MBSFN sub-frames that appear when SFN mod N=Offset. The number of bits indicating the offset is 3, and the parameter Offset takes integer values between [0 . . . 7] (as was noted above).
(2) Radio frames containing MBSFN subframes should be indicated by a parameter N, where the parameter denotes the periodicity of radio frames containing MBSFN subframes. The number of bits indicating the periodicity of radio frames containing MBSFN subframes is 3 (as was also noted above).
(3) The MBSFN subframes in an MBSFN radio frame shall be indicated with a 3 bit parameter, where the parameter value indicates the number of MBSFN subframes in an MBSFN radio frame. Multiple MBSFN subframes in a radio frame shall appear in subsequent DL frames available for MBSFN, starting from subframe #1(FDD) or subframe #3(TDD).

R2-084564 identified two problems that arise by using this scheme. The first problem is referred to as "un-allocation". As for the requirements of a certain number of subframes, the scheme is limited to some extent and even unable to perform the resource allocation, which directly affects the flexibility of the resource allocation under overlapped coverage. In the MBSFN area it will also affect the gain of multicast and unicast scheduling. The second problem is referred to as "over-allocation", which is used to perform the configuration to deal with the problem that the requirements of a certain number of subframes cannot be configured, which results in the waste of the radio resources.

Figure 2:
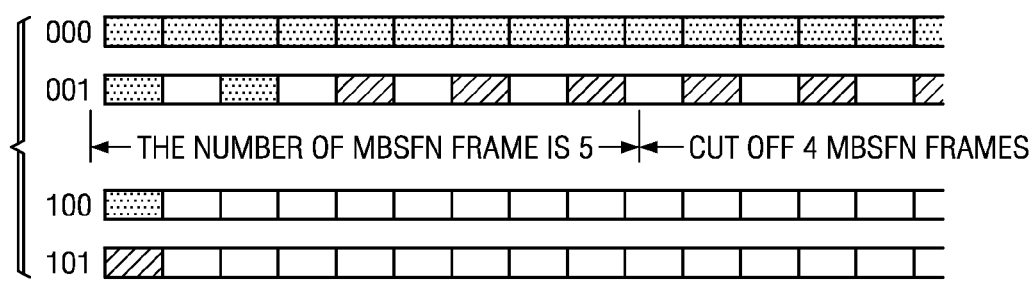
FIG. 2 reproduces a figure from R2-084564 and is useful in gaining an understanding of the background of the embodiments of this invention.

In order to attempt to mitigate the un-allocation scenario R2-084564 suggested the use of a method to improve the mechanism agreed to in RAN2 62bis. The method proposed in R2-084564 is to add the parameter Q which indicates the number of MBSFN frames. For example, the value of Q is said to take the count of from the least SFN to the greatest SFN. As can be seen from FIG. 2 herein, the second value indicates that every 2nd radio frame includes the MBSFN, with the Q as 5, the number of MBSFN frames is decreased from 9 to 5.

In the same scenario, when the parameter Q has a value of 5 (3 bits) this means the number of MBSFN frames is 5, beginning with the number of the first SFN.

The proposal in R2-084564 is sub-optimal in that with a given value Q=q, q radio frames per 320 ms are reserved independent of N. This results in unnecessary code points and, as a result, is wasteful of signaling resources. In addition, similar to the sub-optimum nature of an agreed upon scheme (i.e., 3 bits are always used to signal Offset, although Offset cannot be greater than N−1), the proposed value range is independent of those of N, Offset. Furthermore, as it has been defined in the proposal in R2-084564 unless 5 additional bits are used to signal Q, an arbitrary number of radio frames per 320 ms still cannot be reserved.

As is described below, the exemplary embodiments of this invention provide a signaling technique wherein an arbitrary number of frames per 320 ms can be reserved, at the cost of only one additional signaling bit with respect to a previous agreement.

Figure 1:
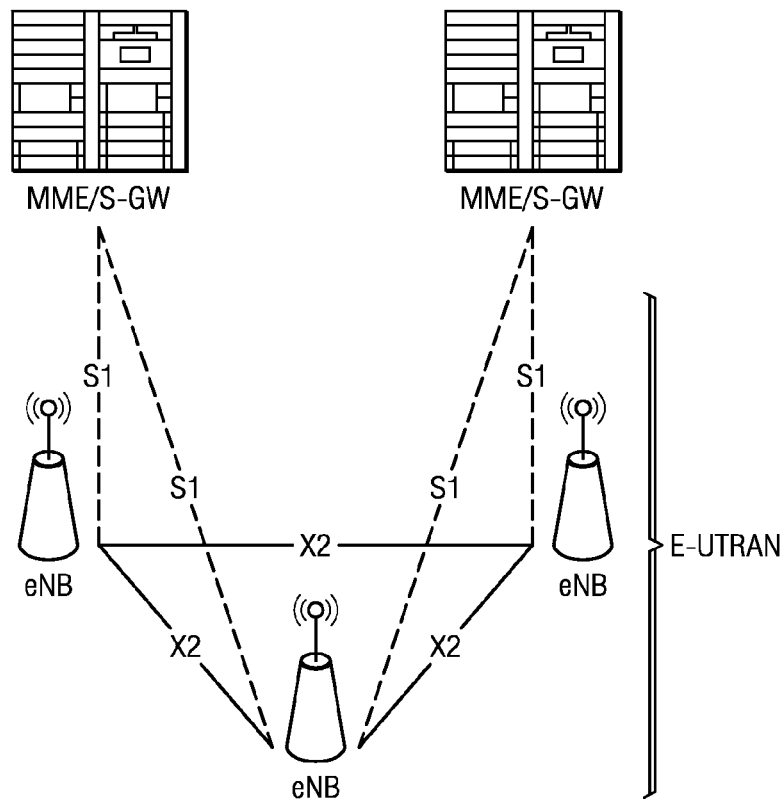
FIG. 1 reproduces FIG. 4 of 3GPP TS 36.300, and shows the overall architecture of the E-UTRAN system.
Figure 3:
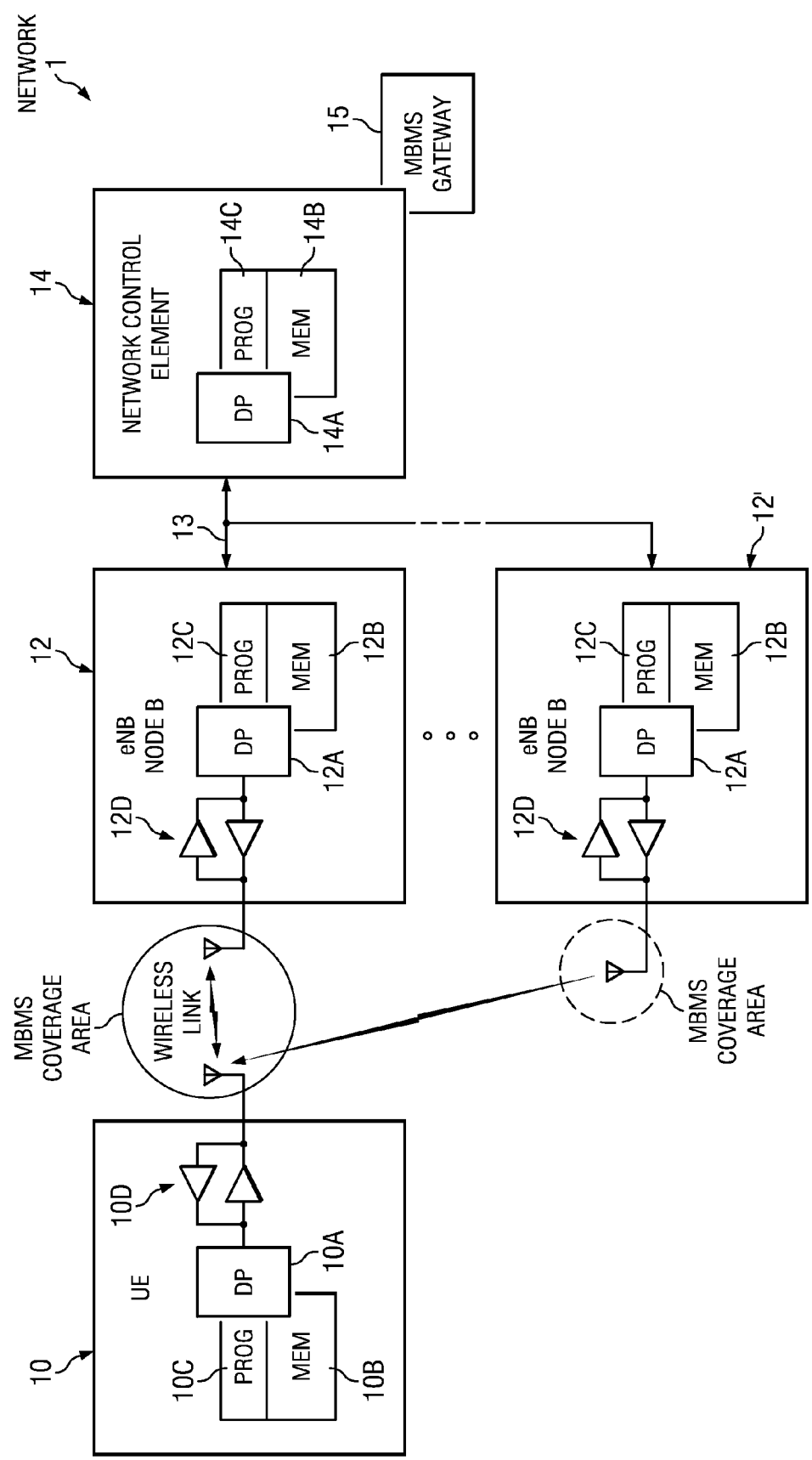
FIG. 3 illustrates a simplified block diagram of a wireless communication system containing various electronic devices that are suitable for use in practicing the exemplary embodiments of this invention.

Reference is made first to FIG. 3 for illustrating a simplified block diagram of various electronic devices that are suitable for use in practicing the exemplary embodiments of this invention. In FIG. 3 a wireless network 1 is adapted for communication with an apparatus 10, also referred to herein for convenience as a UE 10, via another apparatus, such as a network access node 12, also referred to herein for convenience as a Node B (base station) and, more specifically, an eNB 12. The network 1 may include a network control element (NCE) 14 that may include the MME/S-GW functionality shown in FIG. 1. The UE 10 includes a controller, such as a computer or a data processor (DP) 10A, a computer-readable memory medium embodied as a memory (MEM) 10B that stores a program of computer instructions (PROG) 10C, and a suitable radio frequency (RF) transceiver 10D for bidirectional wireless communications with the eNB 12 via one or more antennas. The eNB 12 also includes a controller, such as a computer or a data processor (DP) 12A, a computer-readable memory medium embodied as a memory (MEM) 12B that stores a program of computer instructions (PROG) 12C, and a suitable RF transceiver 12D for communication with the UE 10 via one or more antennas. The eNB 12 is coupled via a data path 13 to the NCE 14, which may be implemented as the S1 interface shown in FIG. 1, which also includes at least one DP 14A and a MEM 14B storing an associated PROG 14C. At least one of the PROGs 10C and 12C is assumed to include program instructions that, when executed by the associated DP, enable the electronic device to operate in accordance with the exemplary embodiments of this invention, as will be discussed below in greater detail.

That is, the exemplary embodiments of this invention may be implemented at least in part by computer software executable by the DP 10A of the UE 10 and by the DP 12A of the eNB 12, or by hardware, or by a combination of software and hardware.

Typically there will be a plurality of UEs 10 serviced by the eNB 12. The eNBs 10 may or may not be identically constructed, but in general are all assumed to be electrically and logically compatible with the relevant network protocols and standards needed for operation in the wireless network 1.

In the MBSFN embodiments that are of particular interest to this invention there can be a plurality (two or more) of eNBs (designated eNB 12 and eNB 12') each providing a MBMS SFN coverage area whereby the UE 10 can simultaneously receive the multimedia information in the SFN. Further, the NCE 14 can contain, or be coupled with, a MBMS gateway 15 that can provide overall control of the MBSFN network.

The various embodiments of the UE 10 can include, but are not limited to, cellular phones, personal digital assistants (PDAs) having wireless communication capabilities, portable computers having wireless communication capabilities, image capture devices such as digital cameras having wireless communication capabilities, gaming devices having wireless communication capabilities, music storage and playback appliances having wireless communication capabilities, Internet appliances permitting wireless Internet access and browsing, as well as portable units or terminals that incorporate combinations of such functions.

The MEMs 10B, 12B and 14B may be of any type suitable to the local technical environment and may be implemented using any suitable data storage technology, such as semiconductor-based memory devices, flash memory, magnetic memory devices and systems, optical memory devices and systems, fixed memory and removable memory. The DPs 10A, 12A and 14A may be of any type suitable to the local technical environment, and may include one or more of general purpose computers, special purpose computers, microprocessors, digital signal processors (DSPs) and processors based on a multicore processor architecture, as non-limiting examples.

An aspect of the exemplary embodiments of this invention is to provide a parameter, which may be referred to for convenience as "Q", that is defined as "how many frames from the end (in every 32-frame period) of the reservation implied by {Period, Offset} are always unused". In this formulation Period refers to the same parameter as N discussed earlier. In this manner, and in contradistinction to the definition and usage of the Q parameter in the proposal of R2-084564, with any given value of Period, only values of Q up to max {0, (32/(2*Period)−1)} need to be considered, since Q=32/(2*Period) reserves the same number of frames as would be reserved by doubling Period and having Q=0. With Period=1, this implies a maximum value of 15 for Q. Note that for efficient signalling of Q, the above observation can be combined with the fact that with a given value of Period, only values of Offset up to (Period−1) can occur.

Therefore, the value ranges of the Offset and Q parameters, with a given Period, referred to below as N, that are needed to reserve anywhere between 1 and 32 frames per 320 ms are as follows:

| N | Offset | Q |
|---|--------|---|
| 32 | [0, . . . , 7] | [0] |
| 16 | [0, . . . , 7] | [0] |
| 8 | [0, . . . , 7] | [0, 1] |

-continued

| N | Offset | Q |
|---|--------|---|
| 4 | [0, ..., 3] | [0, ..., 3] |
| 2 | [0, 1] | [0, ..., 7] |
| 1 | [0] | [0, ..., 15] |

It can be recalled from the discussion above that in an agreed upon scheme, radio frames containing MBSFN subframes appear when SFN mod N=Offset is true, and that the value range of N (Period) corresponds to having in every period of 32 radio frames, respectively, 32, 16, 8, 4, 2, or 1 frame containing MBSFN subframes.

It can be seen above that with a given value of N, all combinations of Offset and Q always require at most 16 code points and can thus be signaled using just 4 bits.

From the above value ranges it can be observed that given the value of Period, the value range of Offset is always $[0, \ldots, \min\{8, \text{Period}\} - 1]$. Utilizing this fact, given the value of Period, the values of Offset and Q can be jointly signalled as $X = Q * \min\{8, \text{Period}\} + \text{Offset}$.

It can be readily verified that with each value of Period, this approach provides a one-to-one mapping of the applicable value pairs of {Offset, Q} to (in some cases a subset of) $[0, \ldots, 15]$.

Given the separately signaled values of Period and X, the UE 10 in turn can extract Offset=X mod min{8,Period}, and Q=X div min{8,Period}, where x div y denotes the result of the division x/y rounded down to the nearest integer.

Given the meaning of Q in accordance with the exemplary embodiments of this invention, and the values of Period, Offset and Q, the condition for the radio frames applicable to a reservation become SFN mod Period=Offset (the current condition), AND (SFN mod 32)div Period<32/Period−Q.

The use of these exemplary embodiments results in a condition where there are no reserved, but always completely unused, radio frames.

In accordance with these exemplary embodiments the network 1 of FIG. 3 separately signals N using 3 bits, and jointly signals Offset and Q using 4 bits. The value of N is used to derive the values of Offset and Q from the 4-bit value. Compared to a previously proposed technique of signaling N and Offset each with 3 bits, the approach of this invention requires only one additional bit of signaling.

One exemplary and non-limiting modification to 3GPP TS 36.311 in order to implement the exemplary embodiments is shown below.

It is noted that new information elements, in accordance with the exemplary embodiments of the invention, may be referred to as radioFrameAllocationComposite, radioFrameAllocationOffset, radioFrameAllocationPeriod, and radioFrameAllocationUnused elements, as shown below. It is further noted that these proposed names, as shown below, are not limiting, and that the names for the new information elements, according to the exemplary embodiments of the invention, may be different.

SystemInformationBlockType2 information element

```
-- ASN1START
SystemInformationBlockType2 ::=        SEQUENCE {
        accessBarringInformation            SEQUENCE {
            accessBarringForEmergencyCalls       BOOLEAN,
            accessBarringForSignalling           AccessClassBarringInformation
        OPTIONAL, -- Need OP
            accessBarringForOriginatingCalls    AccessClassBarringInformation
        OPTIONAL -- Need OP
        }            OPTIONAL,
                                                 -- Need OP
        radioResourceConfigCommon
        RadioResourceConfigCommonSIB,
        ue-TimersAndConstants                UE-TimersAndConstants,
        frequencyInformation                 SEQUENCE {
            ul-EARFCN                                INTEGER
    (0..maxEARFCN)              OPTIONAL,    -- Need OP
            ul-Bandwitdh                         ENUMERATED {
    n15, n25, n50, n75, n100, spare10,
        spare9, spare8, spare7, spare6, spare5,
        spare4, spare3, spare2, spare1 },
            additionalSpectrumEmission           INTEGER (0..31)
        },
        mbsfn-SubframeConfiguration          MBSFN-SubframeConfiguration
                OPTIONAL,
        ...
}
AccessClassBarringInformation ::=  SEQUENCE {
    accessProbabilityFactor                  ENUMERATED {
                                                    p00,p05,
    p10, p15, p20, p25, p30, p40,
                                                    p50,p60,
    p70, p75, p80, p85, p90, p95},
        accessBarringTime                    ENUMERATED {s4, s8, s16,
    s32, s64, s128, s256, s512},
        accessClassBarringList               AccessClassBarringList
}
AccessClassBarringList ::=         SEQUENCE (SIZE (5)) OF SEQUENCE {
    accessClassBarring                       BOOLEAN
}
```

```
MBSFN-SubframeConfiguration ::= SEQUENCE (SIZE (1..maxMBSFN-Allocations))
OF SEQUENCE {
    radioframeAllocationPeriod      ENUMERATED {n1, n2, n4, n8, n16,
n32},
    radioframeAllocationComposite   INTEGER (0..15),
    subframeAllocation              INTEGER (1..7)
}
-- ASN1STOP
```

SystemInformationBlockType2 field descriptions
accessBarringForEmergencyCalls
Access class barring for AC 10.
accessBarringForSignalling
Access class barring for the case of mobile originating signalling
accessBarringForOriginatingCalls
Access class barring for the case of mobile originating calls
accessProbabilityFactor
If the random number drawn by the UE is lower than this value, access is allowed. Otherwise the access is barred.
accessClassBarringTime
Mean access barring time in seconds.
accessClassBarringList
Access class barring for AC 11-15. First in the list is for AC 11, second in the list is for AC 12, and so on
ul-EARFCN
Default value determined from default TX-RX frequency separation defined in [36.101]
SystemInformationBlockType2 field descriptions
accessBarringForEmergencyCalls
Access class barring for AC 10.
accessBarringForSignalling
Access class barring for the case of mobile originating signalling
accessBarringForOriginatingCalls
Access class barring for the case of mobile originating calls
ul-Bandwidth
Parameter: Uplink bandwidth [36.101]. Value n6 corresponds to 6 resource blocks, n15 to 15 resource blocks and so on
additionalSpectrumEmission
Defined in [36.101]
mbsfn-SubframeConfiguration
Defines the subframes that are reserved for MBSFN in downlink.
radioFrameAllocationPeriod
Radio-frames that contain MBSFN subframes occur when the conditions
SFN mod radioFrameAllocationPeriod = radioFrameAllocationOffset, and
(SFN mod 32) div radioFrameAllocationPeriod < 32/
radioFrameAllocationPeriod − radioFrameAllocationUnused
are satisfied, where div denotes integer part of division. n1 denotes value 1, n2 denotes value 2, and so on.
With given radioFrameAllocationPeriod,
radioFrameAllocationOffset has value range [0, . . . , min{8, radioFrameAllocationPeriod} − 1], and
radioFrameAllocationUnused has value range [0, . . . , max{0, (32/(2 * radioFrameAllocationPeriod) − 1)}].
radioFrameAllocationOffset and radioFrameAllocationUnused are jointly signalled in radioFrameAllocationComposite.
radioFrameAllocationComposite
Used to jointly signal radioFrameAllocationOffset and radioFrameAllocationUnused (see radioFrameAllocationPeriod).
Network signals radioFrameAllocationComposite as the value of the expression
radioFrameAllocationUnused * min{8, radioFrameAllocationPeriod} + radioFrameAllocationOffset.
From the values of radioFrameAllocationPeriod and radioFrameAllocationComposite, the UE extracts
radioFrameAllocationOffset = radioFrameAllocationComposite mod min{8, radioFrameAllocationPeriod}, and
radioFrameAllocationUnused = radioFrameAllocationComposite div min{8, radioFrameAllocationPeriod},
where div denotes integer part of division.
subframeAllocation
Number of MBSFN subframes within a radio frame carrying MBSFN. The MBSFN subframes are allocated from the beginning of the radio-frame in consecutive order with the restriction that only those subframes that may carry MBSFN are allocated: subframes 0 and 5 are not allocated; subframe 4 is not allocated (FDD); subframes 1, 6 and uplink subframes are not allocated (TDD).

Based on the foregoing it should be apparent that the exemplary embodiments of this invention provide a method, apparatus and computer program product(s) to efficiently signal MBMS-related parameters from the network 1 to the UE 10.

Figure 4:
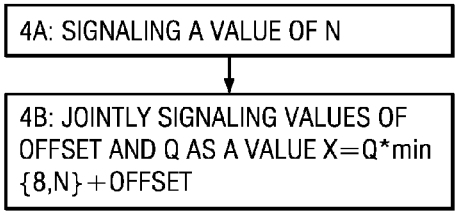
FIG. 4 is a logic flow diagram that illustrates the operation of a first method, and a result of execution of computer program instructions, in accordance with the exemplary embodiments of this invention.

FIG. 4 is a logic flow diagram that illustrates the operation of a first method, and a result of execution of computer program instructions, in accordance with the exemplary embodiments of this invention. At Block 4A a network node signals a value of N (Period), and at Block 4B the network node jointly signals values of Offset and Q as a value X=Q*min {8,N}+Offset.

The method of the preceding paragraph where N is indicative of radio frames containing MBSFN subframes when SFN mod N=Offset is true, where a value range of N corresponds to having in every period of 32 radio frames, respectively, 32, 16, 8, 4, 2, or 1 frame containing MBSFN subframes, and where Q is indicative of how many frames from the end (in every 32-frame period) of the reservation implied by {N, Offset} are always unused.

Figure 5:
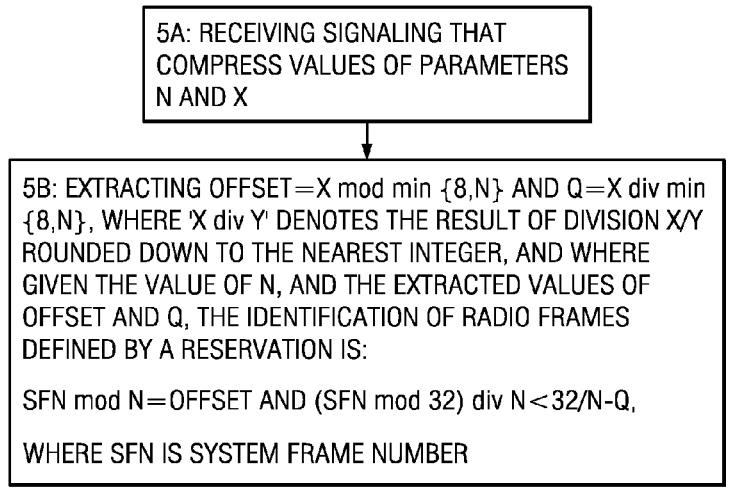
FIG. 5 is a logic flow diagram that illustrates the operation of a second method, and a result of execution of computer program instructions, in accordance with the exemplary embodiments of this invention.

FIG. 5 is a logic flow diagram that illustrates the operation of a second method, and a result of execution of computer program instructions, in accordance with the exemplary embodiments of this invention. At Block 5A a user equipment receives signaling that comprises values of parameters N and X, and at Block 5B the user equipment extracts Offset=X mod min {8,N} and Q=X div min {8,N}, where 'x div y' denotes the result of the division x/y rounded down to the nearest integer, and where given the value of N, and the extracted values of Offset and Q, the identification of radio frames defined by a reservation is:

SFN mod N=Offset, AND (SFN mod 32)div $N$<32/Period–Q, where SFN is system frame number.

Figure 6:
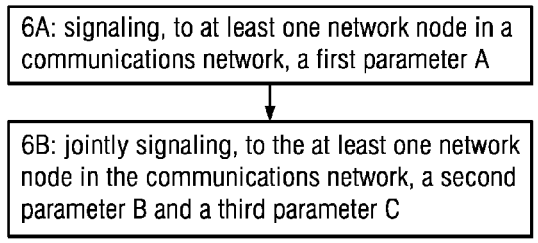
FIG. 6 is a logic flow diagram that illustrates another operation, and a result of execution of computer program instructions, in accordance with the exemplary embodiments of this invention.

FIG. 6 is a logic flow diagram that illustrates another operation of a method, and a result of execution of computer program instructions, in accordance with the exemplary embodiments of this invention. At Block 6A, a network node such as a base station or a user equipment, signals to at least one network node in a communications network, a first parameter A, and At Block 6B the network node jointly signals, to the at least one network node in the communications network, a second parameter B and a third parameter C.

In accordance with the paragraph above, the jointly signaling comprises signaling values of the second and third parameters in the most significant bits and the least significant bits, respectively, of a value X, where X is equal to B*f(A)+C, where f(A) is such a predefined function of the first parameter A that, with all allowed values of A, is equal to 2 raised to a positive integer power, and is known to be greater than the largest allowed value of C.

Further, in accordance with the paragraph above, the first parameter A may comprise an indication of radio frames containing multimedia broadcast single frequency network subframes, the second parameter B may comprise an offset value, and the third parameter C may comprise an indication of a number of frames, from an end of a reservation.

Further, in accordance with the paragraph above, the signaling the indication of radio frames containing the multimedia broadcast single frequency network subframes comprises signaling a value N, where N is signaled using 3 bits.

In accordance with the paragraph above, a value range of N corresponds to having in every period of 32 frames, respectively, 32, 16, 8, 4, 2, or 1 frame(s) containing the multimedia broadcast single frequency network subframes.

In addition, in accordance with the paragraphs above, N is indicative of radio frames containing the multimedia broadcast single frequency network subframes when SFN mod N=Offset is true, where SFN is a system frame number.

Further, in accordance with the paragraphs above, the jointly signaling includes signaling values of Offset and Q as a value X, where X is equal to Q*min {8,N}+Offset, where Q is indicative of the number of frames from the end of the reservation that are always unused and where N is indicative of radio frames containing the multimedia broadcast single frequency network subframes.

In accordance with the paragraph above, the reservation is implied by the value N and the offset value.

Figure 7:
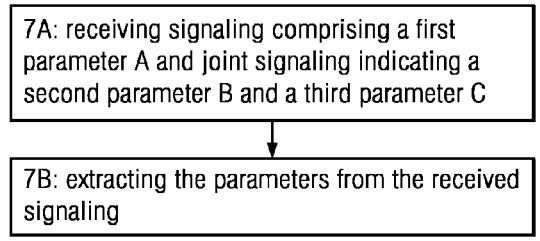
FIG. 7 is a logic flow diagram that illustrates another operation, and a result of execution of computer program instructions, in accordance with the exemplary embodiments of this invention.

FIG. 7 is a logic flow diagram that illustrates another operation of a method, and a result of execution of computer program instructions, in accordance with the exemplary embodiments of this invention. At Block 7A, a network node such as user equipment or a base station, receives signaling comprising a first parameter A and joint signaling indicating a second parameter B and a third parameter C. At Block 7B the network node extracts the parameters from the received signaling Further, in accordance with the paragraph above, the extracting comprises extracting the second and third parameters from the most significant bits and the least significant bits, respectively, of the jointly signaled value X, as B=X div f(A) and C=X mod f(A), where f(A) is such a predefined function of the first parameter A that, with all allowed values of A, is equal to 2 raised to a positive integer power, and is known to be greater than the largest allowed value of C.

Further, in accordance with the paragraph above, where the first parameter A comprises an indication of radio frames containing multimedia broadcast single frequency network subframes, where the second parameter B comprises an offset value, and where the third parameter C comprises an indication of a number of frames, from an end of a reservation.

Additionally, in accordance with the paragraph above, extracting includes extracting, from the received signaling including the indication of radio frames, a value N, where N is received in 3 bits of the signaling.

In accordance with the paragraph above, the value range of N corresponds to having in every period of 32 frames, respectively, 32, 16, 8, 4, 2, or 1 frame(s) containing the multimedia broadcast single frequency network subframes.

Further, in accordance with the paragraphs above, N is indicative of radio frames containing the multimedia broadcast single frequency network subframes when SFN mod N=Offset is true, where SFN is a system frame number.

Additionally, in accordance with the paragraphs above, where extracting includes extracting, from the joint signaling, values of Offset and Q as a value X, where X is equal to Q*min {8,N}+Offset, where Q is indicative of the number of frames from the end of the reservation that are always unused and where N is indicative of radio frames containing the multimedia broadcast single frequency network subframes.

In accordance with the paragraph above, the reservation is implied by the value N and the offset value.

Further, a method of any of the paragraphs above can be performed in a user equipment of the communications network.

The various blocks shown in FIGS. 4-7 may be viewed as method steps, and/or as operations that result from operation of computer program code, and/or as a plurality of coupled logic circuit elements constructed to carry out the associated function(s).

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof. As such, it should be appreciated that at least some aspects of the exemplary embodiments of the inventions may be practiced in various components such as integrated circuit chips and modules.

It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

For example, while the exemplary embodiments have been described above in the context of the E-UTRAN (UTRAN-LTE) system, it should be appreciated that the exemplary embodiments of this invention are not limited for use with only this one particular type of wireless communication system, and that they may be used to advantage in other wireless communication systems.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Further, the various names used for the described parameters (e.g., N, Q, Offset, X) are not intended to be limiting in any respect, as these parameters may be identified by any suitable names (as was done above by using Period in place of N). Further, the formulas and expressions that use these various parameters may differ from those expressly disclosed herein. Further, the various names assigned to different channels (e.g., BCCH) are not intended to be limiting in any respect, as these various channels may be identified by any suitable names.

Furthermore, some of the features of the various non-limiting and exemplary embodiments of this invention may be used to advantage without the corresponding use of other features. As such, the foregoing description should be considered as merely illustrative of the principles, teachings and exemplary embodiments of this invention, and not in limitation thereof.

It should be noted that the terms "connected," "coupled," or any variant thereof, mean any connection or coupling, either direct or indirect, between two or more elements, and may encompass the presence of one or more intermediate elements between two elements that are "connected" or "coupled" together. The coupling or connection between the elements can be physical, logical, or a combination thereof. As employed herein two elements may be considered to be "connected" or "coupled" together by the use of one or more wires, cables and/or printed electrical connections, as well as by the use of electromagnetic energy, such as electromagnetic energy having wavelengths in the radio frequency region, the microwave region and the optical (both visible and invisible) region, as several non-limiting and non-exhaustive examples.

Furthermore, some of the features of the preferred embodiments of this invention could be used to advantage without the corresponding use of other features. As such, the foregoing description should be considered as merely illustrative of the principles of the invention, and not in limitation thereof.

What is claimed is:

1. A method comprising:
   signaling parameters to at least one network node in a communications network by operations that comprise,
   signaling a first parameter A; and
   jointly signaling, to the at least one network node in the communications network, a second parameter B and a third parameter C, wherein jointly signaling comprises:
   signaling values of the second and third parameters in the most significant bits and the least significant bits, respectively, of a value X, where X is equal to $B*f(A)+C$,
   where $f(A)$ is such a predefined function of the first parameter A that, with all allowed values of A, is equal to 2 raised to a positive integer power, and is known to be greater than a largest allowed value of C.

2. The method according to claim 1 performed in a user equipment of the communications network.

3. A computer readable medium encoded with a computer program executable by a processor to perform the method according to claim 1.

4. A method comprising:
   signaling parameters to at least one network node in a communications network by operations that comprise,
   signaling a first parameter A; and
   jointly signaling, to the at least one network node in the communications network, a second parameter B and a third parameter C, where the first parameter A comprises an indication of radio frames containing multimedia broadcast single frequency network subframes, where the second parameter B comprises an offset value, and where the third parameter C comprises an indication of a number of frames, from an end of a reservation.

5. The method according to claim 4, where signaling the indication of radio frames containing multimedia broadcast single frequency network subframes comprises signaling a value N, where N is signaled using 3 bits, and where the reservation is implied by the value N and the offset value.

6. The method according to claim 4, where a value range of N corresponds to having in every period of 32 frames, respectively, 32, 16, 8, 4, 2, or 1 frame(s) containing the multimedia broadcast single frequency network subframes.

7. An apparatus comprising:
   at least one processor and at least one memory including computer program code;

the at least one memory and the computer program code are configured, with the at least one processor, to cause the apparatus, to signal parameters to at least one network node in a communications network, by performing operations that comprise, signaling a first parameter A; and jointly signaling, to the at least one network node in the communications network, a second parameter B and a third parameter C, wherein jointly signaling comprises:

signaling values of the second and third parameters in the most significant bits and the least significant bits, respectively, of a value X, where X is equal to B*f(A)+C, where f(A) is such a predefined function of the first parameter A that, with all allowed values of A, is equal to 2 raised to a positive integer power, and is known to be greater than a largest allowed value of C.

8. The apparatus according to claim 7 embodied in a user equipment of the communications network.

9. An apparatus comprising:

at least one processor and at least one memory including computer program code;

the at least one memory and the computer program code are configured, with the at least one processor, to cause the apparatus, to signal parameters to at least one network node in a communications network, by performing operations that comprise, signaling a first parameter A; and jointly signaling, to the at least one network node in the communications network, a second parameter B and a third parameter C, where the first parameter A comprises an indication of radio frames containing multimedia broadcast single frequency network subframes, where the second parameter B comprises an offset value, and where the third parameter C comprises an indication of a number of frames, from an end of a reservation.

10. The apparatus according to claim 9, where signaling the indication of radio frames containing the multimedia broadcast single frequency network subframes comprises signaling a value N, where N is signaled using 3 bits, and where the reservation is implied by the value N and the offset value.

11. The apparatus according to claim 10, where a value range of N corresponds to having in every period of 32 frames, respectively, 32, 16, 8, 4, 2, or 1 frame(s) containing the multimedia broadcast single frequency network subframes.

12. A method comprising:

receiving parameters from at least one network node in a communications network by operations that comprise, receiving signaling comprising a first parameter A and joint signaling indicating a second parameter B and a third parameter C; and extracting the parameters from the received signaling, wherein extracting comprises extracting the second and third parameters from the most significant bits and the least significant bits, respectively, of the jointly signaled value X, as B=X div f(A) and C=X mod f(A), where f(A) is such a predefined function of the first parameter A that, with all allowed values of A, is equal to 2 raised to a positive integer power, and is known to be greater than a largest allowed value of C.

13. The method according to claim 12 performed in a user equipment of the communications network.

14. A method comprising:

receiving parameters from at least one network node in a communications network by operations that comprise, receiving signaling comprising a first parameter A and joint signaling indicating a second parameter B and a third parameter C; and extracting the parameters from the received signaling, where the first parameter A comprises an indication of radio frames containing multimedia broadcast single frequency network subframes, where the second parameter B comprises an offset value, and where the third parameter C comprises an indication of a number of frames, from an end of a reservation.

15. The method according to claim 14, where extracting comprises extracting, from the received signaling a value N, where N is indicative of radio frames of radio frames containing multimedia broadcast single frequency network subframes, and where N is received in 3 bits of the signaling.

16. The method according to claim 15, where a value range of N corresponds to having in every period of 32 frames, respectively, 32, 16, 8, 4, 2, or 1 frame(s) containing the multimedia broadcast single frequency network subframes.

17. The method according to claim 15, where the reservation is implied by the value N and the offset value.

* * * * *